United States Patent
Wu et al.

(10) Patent No.: US 8,913,185 B2
(45) Date of Patent: Dec. 16, 2014

(54) MULTI-LEVEL BIDIRECTIONAL MOTION ESTIMATION METHOD AND DEVICE

(71) Applicant: Huawei Technologies Co., Ltd., Shenzhen, Guangdong (CN)

(72) Inventors: Xiaojun Wu, Hangzhou (CN); Benshun Yi, Shenzhen (CN); Jinsheng Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/331,525

(22) Filed: Jul. 15, 2014

(65) Prior Publication Data

US 2014/0327819 A1    Nov. 6, 2014

Related U.S. Application Data

(63) Continuation of application No. PCT/CN2013/084153, filed on Sep. 25, 2013.

(30) Foreign Application Priority Data

Apr. 3, 2013    (CN) .......................... 2013 1 0115703

(51) Int. Cl.
H04N 7/01    (2006.01)
(52) U.S. Cl.
CPC .................................... *H04N 7/014* (2013.01)
USPC .......................... 348/441; 348/452; 348/699

(58) Field of Classification Search
USPC ......... 348/441, 458, 459, 448, 451, 452, 699, 348/700, 402.1, 413.1, 416.1; 375/240.16, 375/240.15; 382/300
IPC ............................................. H04N 7/01,11/20
See application file for complete search history.

(56) References Cited

U.S. PATENT DOCUMENTS

| 6,438,275 | B1 * | 8/2002 | Martins et al. ................ 348/451 |
| 2010/0208820 | A1 | 8/2010 | Huang et al. |

FOREIGN PATENT DOCUMENTS

| CN | 1798339 A | 7/2006 |
| CN | 102123283 A | 7/2011 |
| CN | 102857728 A | 1/2013 |

* cited by examiner

*Primary Examiner* — Sherrie Hsia (57) ABSTRACT

The present invention provides a multi-level bidirectional motion estimation method and device searching for matched blocks in a current frame and a previous frame respectively by using M1×M1 blocks of a to-be-interpolated frame as a mirror center, where the first to-be-determined matched block pair is a pair of matched blocks with a minimum sum of binary absolute difference SHAD value among all pairs of matched blocks searched out in the current frame and the previous frame; and if determined that the SHAD value of the first to-be-determined matched block pair is greater than or equal to an SHAD threshold, splitting the M1×M1 blocks into M2×M2 blocks, and searching for matched blocks again in the current frame and the previous frame respectively by using the M2×M2 blocks of the to-be-interpolated frame as a mirror center. Therefore, accuracy of motion estimation can be improved effectively, and image quality can be improved.

18 Claims, 5 Drawing Sheets

MULTI-LEVEL BIDIRECTIONAL MOTION ESTIMATION METHOD AND DEVICE

CROSS-REFERENCE TO RELATED APPLICATIONS

This application is a continuation of International Application No. PCT/CN2013/084153, filed on Sep. 25, 2013, which claims priority to Chinese Patent Application No. 201310115703.4, filed on Apr. 3, 2013, both of which are hereby incorporated by reference in their entireties.

TECHNICAL FIELD

Embodiments of the present invention relate to the field of an image processing technology, and in particular, to a multi-level bidirectional motion estimation method and device.

BACKGROUND

With development of high-definition digital televisions and high-end multimedia information systems, people impose higher and higher requirements on visual effects of a video source. Therefore, a frame rate of an existing video program source needs to be increased to accomplish better visual effects. Meanwhile, with more and more bandwidth resources being allocated and occupied, most video applications can only obtain very limited bandwidth resources, and a time resolution generally needs to be reduced on an encoder end by discarding a frame, so as to meet the bandwidth requirement, and a decoder end recovers the discarded frame by interpolating the frame, so as to improve video quality.

A video frame interpolation technology, that is, a frame rate up-conversion (Frame Rate Up-Conversion, FRUC) technology, elevates a low frame rate of a video to a high frame rate by interpolating an intermediate frame between two adjacent frames on the decoder end, and implements conversion between different frame rates.

Motion estimation methods are primarily categorized into a unidirectional motion estimation method and a bidirectional motion estimation method. A unidirectional motion estimation method may lead to a problem of "overlap" and "void" of the interpolated frame, and a bidirectional motion estimation method uses a to-be-interpolated frame as a mirror center, which prevents the problem of "overlap" and "void" of the interpolated frame in the motion compensation processing. In the bidirectional motion estimation method in the prior art, a search algorithm in video compression, such as a three-step search algorithm and a diamond search algorithm, is applied in motion estimation. However, as different from video compression, time-space correlation exists between motion vectors due to continuity of motion of video objects, and the use of the search algorithm in the video compression makes the interpolated frames of motion compensation generate image information inconsistent with subjective visual perception. Therefore, accuracy of motion vectors of estimated interpolated blocks is low, which also reduces image quality.

SUMMARY

Embodiments of the present invention provide a multi-level bidirectional motion estimation method and device, which can improve motion estimation accuracy effectively and improve image quality.

According to a first aspect, a multi-level bidirectional motion estimation method is provided, including: searching for matched blocks in a current frame and a previous frame respectively by using M1×M1 blocks of a to-be-interpolated frame as a mirror center, where the previous frame is a frame before the to-be-interpolated frame, the current frame is a frame after the to-be-interpolated frame, and a algorithm for the search includes a three-dimensional recursive search algorithm (3-D Recursive Search, 3-D RS) or a hexagon search algorithm; determining a first to-be-determined matched block pair corresponding to the M1×M1 blocks of the to-be-interpolated frame, where the first to-be-determined matched block pair is a pair of matched blocks with a minimum sum of binary absolute difference (Sum of Binary Absolute Difference, SBAD) value among all pairs of matched blocks searched out in the current frame and the previous frame; determining motion vectors of the M1×M1 blocks of the to-be-interpolated frame according to motion vectors of the first to-be-determined matched block pair if it is determined that an SHAD value of the first to-be-determined matched block pair is less than an SBAD threshold; and if it is determined that the SBAD value of the first to-be-determined matched block pair is greater than or equal to the SBAD threshold, splitting the M1×M1 blocks of the to-be-interpolated frame into M2×M2 blocks, and searching for matched blocks again in the current frame and the previous frame respectively by using the M2×M2 blocks of the to-be-interpolated frame as a mirror center, where an SBAD threshold for searching for the matched blocks again is ¼ of the SBAD threshold applied in the previous time of searching for the matched blocks, both M1 and M2 are 2 to the power of m, m is a positive integer, and M2=M1/2.

With reference to the first aspect and the foregoing implementation manners of the first aspect, in another implementation manner of the first aspect, before the searching matched blocks in a current frame and a previous frame respectively by using M1×M1 blocks of a to-be-interpolated frame as a mirror center, a first SBAD value, a second SBAD value, and a third SBAD value are determined, where the first SBAD value is an SBAD value generated by bidirectional motion estimation between the current frame and the previous frame, the second SBAD value is an SBAD value generated by bidirectional motion estimation between the current frame and a frame after a next frame, the third SBAD value is an SBAD value generated by bidirectional motion estimation between the previous frame and the frame after the next frame, and the frame after the next frame is a frame after the current frame; and the searching for matched blocks in a current frame and a previous frame respectively by using M1×M1 blocks of a to-be-interpolated frame as a mirror center includes: searching for the matched blocks in the current frame and the previous frame respectively by using the M1×M1 blocks of the to-be-interpolated frame as the mirror center when the first SBAD value is a minimum value among the first SBAD value, the second SBAD value, and the third SBAD value.

With reference to the first aspect and the foregoing implementation manner of the first aspect, in another implementation manner of the first aspect, the M1×M1 blocks of the to-be-interpolated frame obtained by extrapolating corresponding matched blocks of the current frame when the second SBAD value is a minimum value among the first SBAD value, the second SBAD value, and the third SBAD value; and the M1×M1 blocks of the to-be-interpolated frame are obtained by extrapolating corresponding matched blocks of the previous frame when the third SBAD value is a minimum value among the first SBAD value, the second SBAD value, and the third SBAD value.

With reference to the first aspect and the foregoing implementation manners of the first aspect, in another implementation manner of the first aspect, when an object enters or exits a scene at a boundary of the current frame against a boundary of the previous frame, before the searching for the matched blocks in a current frame and a previous frame respectively by using M1×M1 blocks of the to-be-interpolated frame as a mirror center, the method further includes: setting boundary pixel values of both the current frame and the previous frame to non zeros, and extending the boundaries of the current frame and the previous frame circumferentially by M1 pixels respectively.

With reference to the first aspect and the foregoing implementation manners of the first aspect, in another implementation manner of the first aspect, when a scene is switched at the current frame against the previous frame, after the matched blocks are searched out for the first time, the method further includes: obtaining the to-be-interpolated frame in an extrapolation manner when it is determined that the number of all the following to-be-determined matched block pairs is greater than a preset threshold, that is, the to-be-determined matched block pairs that correspond to the M1×M1 blocks of the to-be-interpolated frame and have an SBAD value greater than or equal to the SBAD threshold.

With reference to the first aspect and the foregoing implementation manners of the first aspect, in another implementation manner of the first aspect, if it is determined that the SBAD value of the first to-be-determined matched block pair is greater than or equal to the SBAD threshold after K levels of motion estimation in the multiple levels of bidirectional motion estimation are performed, a second to-be-determined matched block pair is searched for in a specified zone of the current frame and the previous frame, where the specified zone is all blocks that do not participate in the interpolation in the current frame and the previous frame, and K is a positive integer greater than or equal to 2; and motion vectors of M×M blocks of the to-be-interpolated frame are determined according to motion vectors of the second to-be-determined matched block pair, where the M×M blocks of the to-be-interpolated frame are matched blocks corresponding to the $K^{th}$ level of motion estimation, M is 2 to the power of m, and m is a positive integer.

With reference to the first aspect and the foregoing implementation manners of the first aspect, in another implementation manner of the first aspect, if it is determined that the SBAD value of the first to-be-determined matched block pair is greater than or equal to the SBAD threshold after the K levels of motion estimation in the multiple levels of bidirectional motion estimation are performed, the motion vectors of M×M blocks of the to-be-interpolated frame are determined according to motion vectors of matched block pairs around the first to-be-determined matched block pair, where the M×M blocks of the to-be-interpolated frame are matched blocks corresponding to the $K^{th}$ level of motion estimation, M is 2 to the power of m, and m is a positive integer.

With reference to the first aspect and the foregoing implementation manners of the first aspect, in another implementation manner of the first aspect, the searching for matched blocks in a current frame and a previous frame respectively by using M1×M1 blocks of a to-be-interpolated frame as a mirror center includes: searching for the matched blocks twice in the current frame and the previous frame respectively by using the M1×M1 blocks of the to-be-interpolated frame as a mirror center, where the two times of searching for the matched blocks have opposite orders of search.

With reference to the first aspect and the foregoing implementation manners of the first aspect, in another implementation manner of the first aspect, the determining a first to-be-determined matched block pair corresponding to the M1×M1 blocks of the to-be-interpolated frame includes: determining the first to-be-determined matched block pair corresponding to the M1×M1 blocks of the to-be-interpolated frame based on a block matching criterion, where the block matching criterion is:

$$SBAD(v, B_{i,j}) = \sum_{s \in B_{i,j}} |f_{n-1}(s+v) - f_{n+1}(s-v)|$$

where, the SBAD is the SBAD value of the matched block pair, $B_{i,j}$ is the M1×M1 blocks of the to-be-interpolated frame, s is a pixel point of the to-be-interpolated frame, v is a shift vector, $f_{n-1}$ is a pixel value of the current frame, and is a pixel value of the previous frame.

According to a second aspect, a multi-level bidirectional motion estimation device is provided, including: a match searching unit, configured to search for matched blocks in a current frame and a previous frame respectively by using M1×M1 blocks of a to-be-interpolated frame as a mirror center, where the previous frame is a frame before the to-be-interpolated frame, the current frame is a frame after the to-be-interpolated frame, and a algorithm for the search includes a three-dimensional recursive search algorithm or a hexagon search algorithm; and a determining unit, configured to determine a first to-be-determined matched block pair corresponding to the M1×M1 blocks of the to-be-interpolated frame, where the first to-be-determined matched block pair is a pair of matched blocks with a minimum sum of binary absolute difference SBAD value among all pairs of matched blocks searched out by the searching unit in the current frame and the previous frame, where the determining unit is further configured to determine motion vectors of the M1×M1 blocks of the to-be-interpolated frame according to motion vectors of the first to-be-determined matched block pair if it is determined that an SBAD value of the first to-be-determined matched block pair is less than an SBAD threshold; and the match searching unit is further configured to: if the SBAD value of the first to-be-determined matched block pair, which is determined by the determining unit, is greater than or equal to the SBAD threshold, split the M1×M1 blocks of the to-be-interpolated frame into M2×M2 blocks, and search for matched blocks again in the current frame and the previous frame respectively by using the M2×M2 blocks of the to-be-interpolated frame as a mirror center, where an SBAD threshold for searching for the matched blocks again is ¼ of the SBAD threshold applied in the previous time of searching for the matched blocks, both M1 and M2 are 2 to the power of m, m is a positive integer, and M2=M1/2.

With reference to the second aspect and the foregoing implementation manners of the second aspect, in another implementation manner of the second aspect, the determining unit is further configured to determine a first SBAD value, a second SBAD value, and a third SBAD value, where the first SBAD value is an SBAD value generated by bidirectional motion estimation between the current frame and the previous frame, the second SBAD value is an SBAD value generated by bidirectional motion estimation between the current frame and a frame after a next frame, the third SBAD value is an SBAD value generated by bidirectional motion estimation between the previous frame and the frame after the next frame, and the frame after the next frame is a frame after the current frame; and the match searching unit is specifically configured to search for the matched blocks in the current frame and the previous frame respectively by using the M1×M1 blocks of the to-be-interpolated frame as the mirror center when the first SBAD value is a minimum value among the first SBAD value, the second SBAD value, and the third SBAD value.

With reference to the second aspect and the foregoing implementation manner of the second aspect, in another implementation manner of the second aspect, the determining unit is further configured to obtain the M1×M1 blocks of the to-be-interpolated frame by extrapolating corresponding matched blocks of the current frame when the second SBAD value is a minimum value among the first SBAD value, the second SBAD value, and the third SBAD value; and the determining unit is further configured to obtain the M1×M1 blocks of the to-be-interpolated frame by extrapolating corresponding matched blocks of the previous frame when the third SBAD value is a minimum value among the first SBAD value, the second SBAD value, and the third SBAD value.

With reference to the second aspect and the foregoing implementation manners of the second aspect, in another implementation manner of the second aspect, the device further includes an extending unit, and the extending unit is configured to: when an object enters or exits a scene at a boundary of the current frame against a boundary of the previous frame, set boundary pixel values of both the current frame and the previous frame to non zeros, and extend the boundaries of the current frame and the previous frame circumferentially by M1 pixels respectively.

With reference to the second aspect and the foregoing implementation manners of the second aspect, in another implementation manner of the second aspect, the determining unit is further configured to: when a scene is switched at the current frame against the previous frame, after the matched blocks are searched out for the first time, obtain the to-be-interpolated frame in an extrapolation manner when it is determined that the number of all the following to-be-determined matched block pairs is greater than a preset threshold, that is, the to-be-determined matched block pairs that correspond to the M1×M1 blocks of the to-be-interpolated frame and have an SBAD value greater than or equal to the SBAD threshold.

With reference to the second aspect and the foregoing implementation manners of the second aspect, in another implementation manner of the second aspect, the match searching unit is further configured to: if the SBAD value of the first to-be-determined matched block pair, which is determined by the determining unit, is greater than or equal to the SBAD threshold after K levels of motion estimation in the multiple levels of bidirectional motion estimation are performed, search for a second to-be-determined matched block pair in a specified zone of the current frame and the previous frame, where the specified zone is all blocks that do not participate in the interpolation in the current frame and the previous frame; and the determining unit is further configured to determine motion vectors of M×M blocks of the to-be-interpolated frame according to motion vectors of the second to-be-determined matched block pair searched out by the match searching unit, where the M×M blocks of the to-be-interpolated frame are matched blocks corresponding to the $K^{th}$ level of motion estimation, M is 2 to the power of m, m is a positive integer, and K is a positive integer greater than or equal to 2.

With reference to the second aspect and the foregoing implementation manners of the second aspect, in another implementation manner of the second aspect, the determining unit is further configured to: if it is determined that the SBAD value of the first to-be-determined matched block pair is greater than or equal to the SBAD threshold after the K levels of motion estimation in the multiple levels of bidirectional motion estimation are performed, determine the motion vectors of M×M blocks of the to-be-interpolated frame according to motion vectors of matched block pairs around the first to-be-determined matched block pair, where the M×M blocks of the to-be-interpolated frame are matched blocks corresponding to the $K^{th}$ level of motion estimation, M is 2 to the power of m, m is a positive integer, and K is a positive integer greater than or equal to 2.

With reference to the second aspect and the foregoing implementation manners of the second aspect, in another implementation manner of the second aspect, the match searching unit is specifically configured to search for the matched blocks twice in the current frame and the previous frame respectively by using the M1×M1 blocks of the to-be-interpolated frame as a mirror center, where the two times of searching for the matched blocks have opposite orders of search.

With reference to the second aspect and the foregoing implementation manners of the second aspect, in another implementation manner of the second aspect, the determining unit is specifically configured to determine the first to-be-determined matched block pair corresponding to the M1×M1 blocks of the to-be-interpolated frame based on a block matching criterion, where the block matching criterion is:

$$SBAD(v, B_{i,j}) = \sum_{s \in B_{i,j}} |f_{n-1}(s+v) - f_{n+1}(s-v)|$$

where, the SBAD is the SBAD value of the matched block pair, $B_{i,j}$ is the M1×M1 blocks of the to-be-interpolated frame, s is a pixel point of the to-be-interpolated frame, v is a shift vector, $f_{n-1}$ is a pixel value of the current frame, and $f_{n+1}$ is a pixel value of the previous frame.

In the embodiments of the present invention, based on bidirectional motion estimation, the matched blocks are searched for in the frames (the current frame and the previous frame) before and after the to-be-interpolated frame respectively by using the M1×M1 blocks of the to-be-interpolated frame as the mirror center, and a pair of matched blocks with a minimum SBAD value among all the searched pairs of matched blocks is determined as the first to-be-determined matched block. When the SBAD value of the first to-be-determined matched block pair is greater than or equal to the SBAD threshold, the M1×M1 blocks are split into M2×M2 blocks with reference to a multi-level method, and the matched blocks are searched for again, where the SBAD threshold for searching for the matched blocks again is ¼ of the SBAD threshold applied in the previous time of searching for the matched blocks. Therefore, with the multi-level method combined with the bidirectional motion estimation, the M1×M1 blocks of the to-be-interpolated frame are decomposed gradually, and motion information is described more precisely. In addition, a three-dimensional recursive search algorithm or a hexagon search algorithm is applied in the motion estimation, and therefore, a smooth motion vector field can be obtained, convergence is fast, and complexity is low, which improves motion estimation accuracy effectively and improves image quality.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
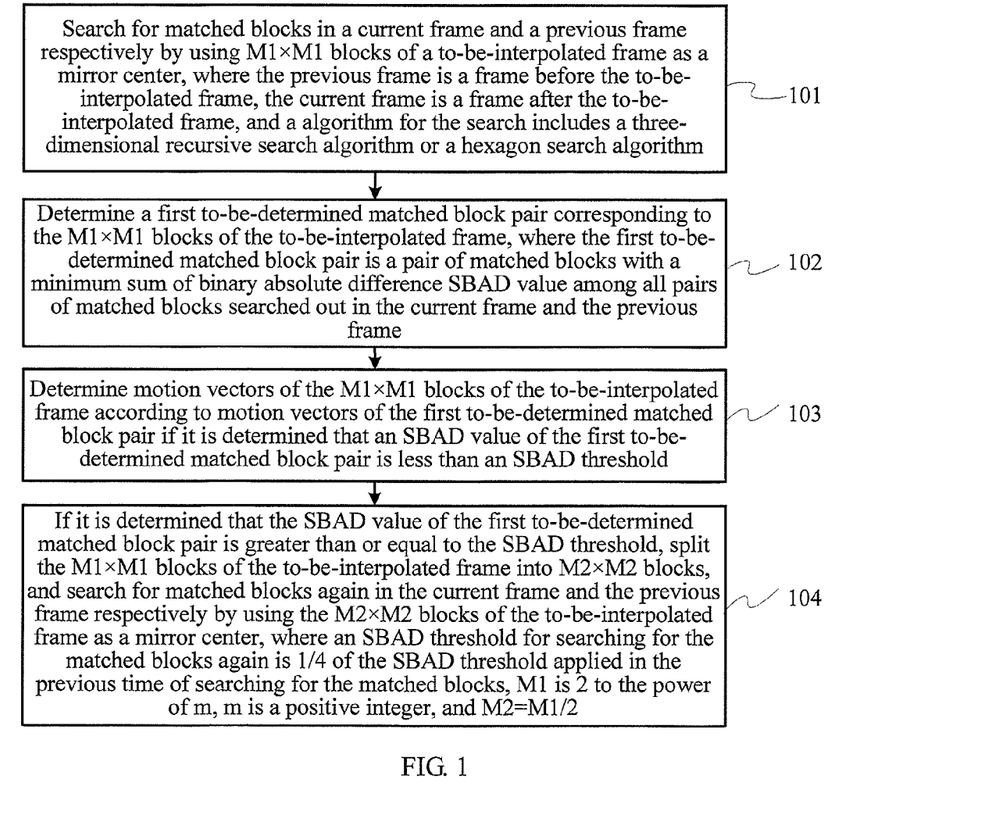
FIG. 1 is a flowchart of a multi-level bidirectional motion estimation method according to an embodiment of the present invention.

FIG. 1 is a flowchart of a multi-level bidirectional motion estimation method according to an embodiment of the present invention. The method in FIG. 1 is executed by a multi-level bidirectional motion estimation device.

101. Search for matched blocks in a current frame and a previous frame respectively by using M1×M1 blocks of a to-be-interpolated frame as a mirror center, where the previous frame is a frame before the to-be-interpolated frame, the current frame is a frame after the to-be-interpolated frame, and a algorithm for the search includes a three-dimensional recursive search algorithm or a hexagon search algorithm.

102. Determine a first to-be-determined matched block pair corresponding to the M1×M1 blocks of the to-be-interpolated frame, where the first to-be-determined matched block pair is a pair of matched blocks with a minimum SBAD value among all pairs of matched blocks searched out in the current frame and the previous frame.

103. Determine motion vectors of the M1×M1 blocks of the to-be-interpolated frame according to motion vectors of the first to-be-determined matched block pair if it is determined that an SBAD value of the first to-be-determined matched block pair is less than an SBAD threshold.

104. If it is determined that the SBAD value of the first to-be-determined matched block pair is greater than or equal to the SBAD threshold, split the M1×M1 blocks of the to-be-interpolated frame into M2×M2 blocks, and search for matched blocks again in the current frame and the previous frame respectively by using the M2×M2 blocks of the to-be-interpolated frame as a mirror center, where an SBAD threshold for searching for the matched blocks again is ¼ of the SBAD threshold applied in the previous time of searching for the matched blocks, both M1 and M2 are 2 to the power of m, m is a positive integer, and M2=M1/2.

In the embodiment of the present invention, based on bidirectional motion estimation, matched blocks are searched for in the frames (the current frame and the previous frame) before and after the to-be-interpolated frame respectively by using the M1×M1 blocks of the to-be-interpolated frame as the mirror center, and a pair of matched blocks with a minimum SBAD value among all the searched pairs of matched blocks is determined as the first to-be-determined matched block. If the SBAD value of the first to-be-determined matched block pair is greater than or equal to the SBAD threshold, the M1×M1 blocks are split into M2×M2 blocks with reference to a multi-level method, and the matched blocks are searched for again, where the SBAD threshold for searching for the matched blocks again is ¼ of the SBAD threshold applied in the previous time of searching for the matched blocks. Therefore, with the multi-level method combined with the bidirectional motion estimation, the M1×M1 blocks of the to-be-interpolated frame are decomposed gradually, and motion information is described more precisely. In addition, a three-dimensional recursive search algorithm or a hexagon search algorithm is applied in the motion estimation, and therefore, a smooth motion vector field can be obtained, convergence is fast, and complexity is low, which improves motion estimation accuracy effectively and improves image quality.

It should be noted that the embodiment of the present invention does not limit the number of blocks into which the to-be-interpolated frame is split, or the size of each matched block. A to-be-interpolated frame is split into one or more matched blocks, and each matched block is an Mi×Mi block, where Mi is a positive integer. The embodiment of the present invention does not limit how many levels of motion estimation in the multi-level method (that is, the value of K in the K levels of motion estimation, where K is a positive integer greater than or equal to 2) is applied. It is assumed that each matched block of the $i^{th}$ level motion estimation is an M1×M1 block, and each matched block of the $(i+1)^{th}$ level motion estimation is an M2×M2 block, where i is a positive integer.

Optionally, in an embodiment, if it is determined that the SBAD value of the first to-be-determined matched block pair is greater than or equal to the SBAD threshold after the K levels of motion estimation in the multiple levels of bidirectional motion estimation are performed, the motion vectors of M×M blocks of the to-be-interpolated frame are determined according to motion vectors of matched block pairs around the first to-be-determined matched block pair, where the M×M blocks of the to-be-interpolated frame are matched blocks corresponding to the $K^{th}$ level of motion estimation, M is 2 to the power of m, and m is a positive integer. For example, the value of K is preset to 4, that is, 4 levels of motion estimation are applied. In the fourth level of motion estimation, if the SBAD value of a to-be-determined matched block pair corresponding to M1×M1 blocks of a to-be-interpolated frame is greater than or equal to the SBAD threshold, the M1×M1 blocks of the to-be-interpolated frame will not be split any more, that is, M is equal to M1, and the motion vectors of M×M blocks of the to-be-interpolated frame are determined according to the motion vectors of matched block pairs around the corresponding to-be-determined matched block pair.

Optionally, in another embodiment, in step 101, the matched blocks are searched for twice in the current frame and the previous frame respectively by using the M1×M1 blocks of the to-be-interpolated frame as a mirror center, where the two times of searching for the matched blocks have opposite orders of search.

Optionally, in another embodiment, after step 102, a first SBAD value, a second SBAD value, and a third SBAD value are determined, where the first SBAD value is an SBAD value generated by bidirectional motion estimation between the current frame and the previous frame, the second SBAD value is an SBAD value generated by bidirectional motion estimation between the current frame and a frame after a next frame, the third SBAD value is an SBAD value generated by bidirectional motion estimation between the previous frame and the frame after the next frame, and the frame after the next frame is a frame after the current frame.

When the first SBAD value is a minimum value among the first SBAD value, the second SBAD value, and the third SBAD value, step 103 or 104 is performed.

When the second SBAD value is the minimum value among the first SBAD value, the second SBAD value, and the third SBAD value, the M1×M1 blocks of the to-be-interpolated frame are obtained by extrapolating corresponding matched blocks of the current frame, that is, the corresponding matched blocks of the current frame are copied as the M1×M1 blocks of the to-be-interpolated frame.

When the third SBAD value is the minimum value among the first SBAD value, the second SBAD value, and the third SBAD value, the M1×M1 blocks of the to-be-interpolated frame are obtained by extrapolating the matched blocks of the current frame that correspond to the M1×M1 blocks of the to-be-interpolated frame, that is, the corresponding matched blocks of the previous frame are copied as the M1×M1 blocks of the to-be-interpolated frame.

The foregoing solution is applicable to a scene in which a background is covered or exposed (that is, the problem of "blocking") due to motion of the object. In the prior art, a blocked zone is detected by using the previous frame, the current frame, and the frame before the previous frame, where the frame before the previous frame is a previous frame of the previous frame. For example, by using the previous frame and the frame before the previous frame, backward motion estimation is performed for the previous frame to generate a backward matching sum of absolute difference (Sum of Absolute Difference, SAD) value; and, by using the previous frame and the current frame, forward motion estimation is performed for the previous frame to generate a forward matching SAD value. In the previous frame, the blocks in which the forward matching SAD value is greater than the backward matching SAD value are a covered zone, and the blocks in which the forward matching SAD value is less than or equal to the backward matching SAD value are an exposed zone.

Therefore, when the solution in the embodiment of the present invention is applied to blocking processing, it is not necessary to perform motion estimation twice, that is, forward motion estimation and backward motion estimation, thereby reducing the amount of computing. In addition, the prior art does not point out how to process the blocks in the to-be-interpolated frame. In a blocking scene, the to-be-interpolated frame obtained through the blocking processing in the embodiment improves image quality effectively.

Optionally, in another embodiment, when an object enters or exits a scene at a boundary of the current frame against a boundary of the previous frame, before step 101, boundary pixel values of both the current frame and the previous frame may be set to non zeros, and the boundaries of the current frame and the previous frame are extended circumferentially by M1 pixels respectively.

When an object enters or exits a boundary of an image, the motion estimation in the prior art leads to a "block effect" at the boundary of the to-be-interpolated frame; however, the to-be-interpolated frame obtained according to the technical solution of the present invention can reduce the "block effect" at the boundary, and improve image quality.

Optionally, in another embodiment, when a scene is switched at the current frame against the previous frame, after the matched blocks are searched for the first time, the to-be-interpolated frame is obtained in an extrapolation manner when it is determined that the number of all the following to-be-determined matched block pairs is greater than a preset threshold, that is, the to-be-determined matched block pairs that correspond to the M1×M1 blocks of the to-be-interpolated frame and have an SBAD value greater than or equal to the SBAD threshold. Optionally, the current frame may be copied as the to-be-interpolated frame, or the previous frame may be copied as the to-be-interpolated frame.

When a scene is switched between adjacent frames, for example, the previous frame is a "rocket" image and the current frame is a "table" image, it is not reasonable to obtain, in an interpolation method, the to-be-interpolated frame that is an overlapping image of the previous frame and the current frame, and it is appropriate to use an extrapolation method, for example, to copy the "rocket" image of the previous frame to obtain the to-be-interpolated frame or copy the "table" image of the current frame to obtain the to-be-interpolated frame. In addition, if the to-be-determined matched block pairs with an SBAD value greater than or equal to the SBAD threshold are not counted until multiple levels of motion estimation are performed, the amount of computing increases and the multiple levels of motion estimation are futile because the to-be-interpolated frame is presumed to be obtained by using an extrapolation method. Therefore, the amount of computing is reduced effectively if the counting is performed after the first time of searching for the matched blocks.

Optionally, in another embodiment, a second to-be-determined matched block pair is searched for in a specified zone of the current frame and the previous frame after K levels of motion estimation are performed, where the specified zone is all blocks that do not participate in the interpolation in the current frame and the previous frame. Motion vectors of M×M blocks of the to-be-interpolated frame are determined according to motion vectors of the second to-be-determined matched block pair, where the M×M blocks of the to-be-interpolated frame are matched blocks corresponding to the $K^{th}$ level of motion estimation, M is 2 to the power of m, and m is a positive integer.

Figure 2A:
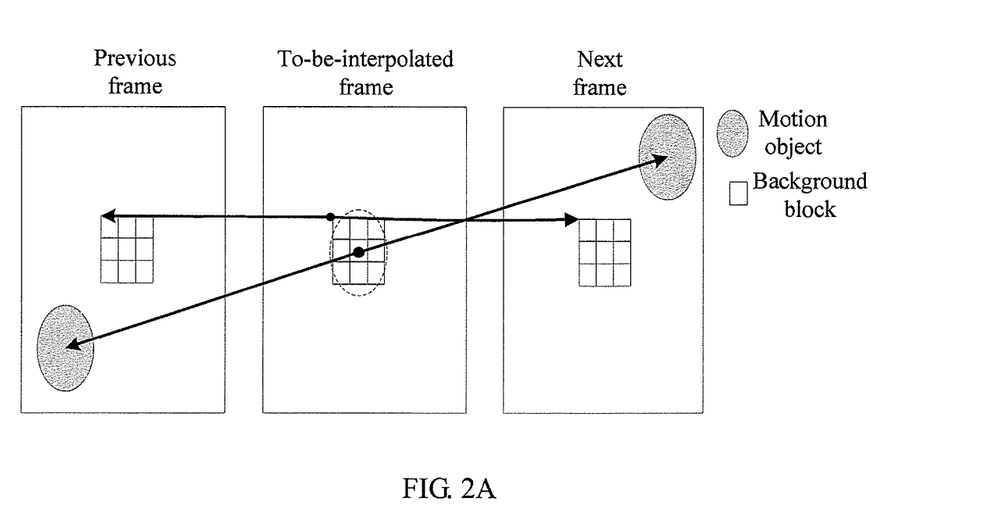
FIG. 2A is an interpolation schematic diagram of inconsistency with visual image feel in a long-distance motion scene of an object.

When a motion scope of an object is far larger than the size of the object (that is, long-distance motion), in an interpolated frame, the corresponding region where the object appears will obtain a background, as shown in FIG. 2A, which is not consistent with visual image information.

Figure 2B:
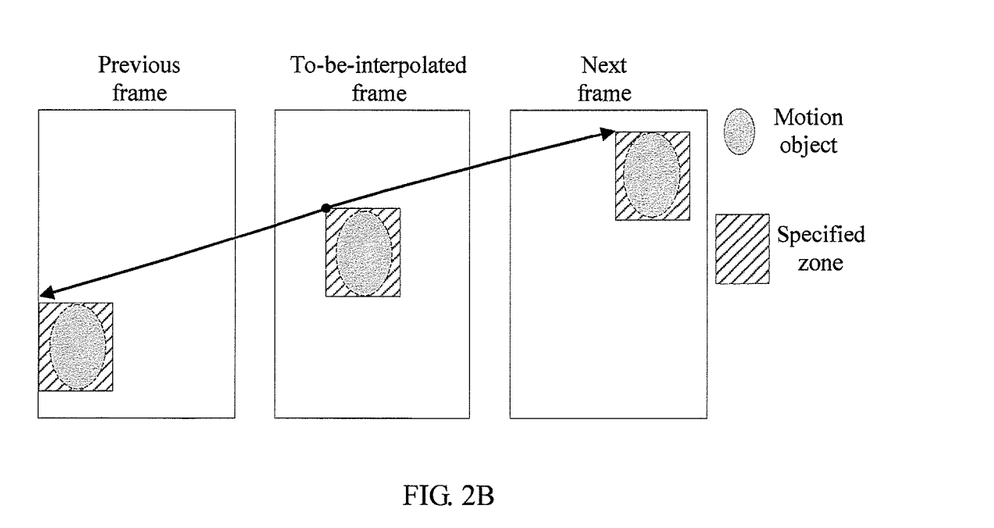
FIG. 2B is an interpolation schematic diagram in a long-distance motion scene of an object according to an embodiment of the present invention.

In a long-distance motion scene of the object, that is, when a motion amplitude of the object goes beyond a match search scope, in the embodiment of the present invention, it is determined that the SBAD value of the first to-be-determined matched block pair is still greater than or equal to the SBAD threshold at the time of searching for matched blocks again for multiple times. Specifically, as shown in FIG. 2B, after K levels of motion estimation are performed, in an interpolation process of an interpolated frame, M×M blocks (such as 4×4 blocks) that participate in the interpolation in two consecutive frames are flagged, and a block that does not participate in the interpolation is defined as a "void". In the two consecutive frames, the gathered "void" blocks are combined and recorded as a specified zone. In other words, all the blocks that do not participate in interpolation in the previous frame and the current frame are combined into the specified zone. Based on that, it is determined whether any long-distance motion occurs. Meanwhile, a second to-be-determined matched block pair is searched for in the specified zone, and motion vectors of M×M blocks of the to-be-interpolated frame are determined according to motion vectors of the second to-be-determined matched block pair.

According to the foregoing technical solution, accuracy of motion estimation can be improved effectively when long-distance motion of the object occurs.

Optionally, in another embodiment, in step 102, the first to-be-determined matched block pair corresponding to the M1×M1 blocks of the to-be-interpolated frame is determined based on a block matching criterion, where the block matching criterion may be the following formula (1):

$$SBAD(v, B_{i,j}) = \sum_{s \in B_{i,j}} |f_{n-1}(s+v) - f_{n+1}(s-v)| \quad (1)$$

where, the SBAD is the SBAD value of the matched block pair, $B_{i,j}$ is the M1×M1 blocks of the to-be-interpolated frame, s is a pixel point of the to-be-interpolated frame, v is a shift vector, $f_{n-1}$ is a pixel value of the current frame, and $f_{n+1}$ is a pixel value of the previous frame.

Understandably, the application of the embodiment of the present invention is not limited. For example, the embodiment of the present invention is applicable to videophones and conference calls. The embodiment of the present invention can also improve image quality of a flatscreen television, for example, overcome defects such as motion blurs, image jitters, and image streaking existing in the display of a liquid crystal display (Liquid Crystal Display, LCD); or, overcome problems such as massive flicker in the display of a plasma display panel (Plasma Display Panel, PDP).

Figure 3:
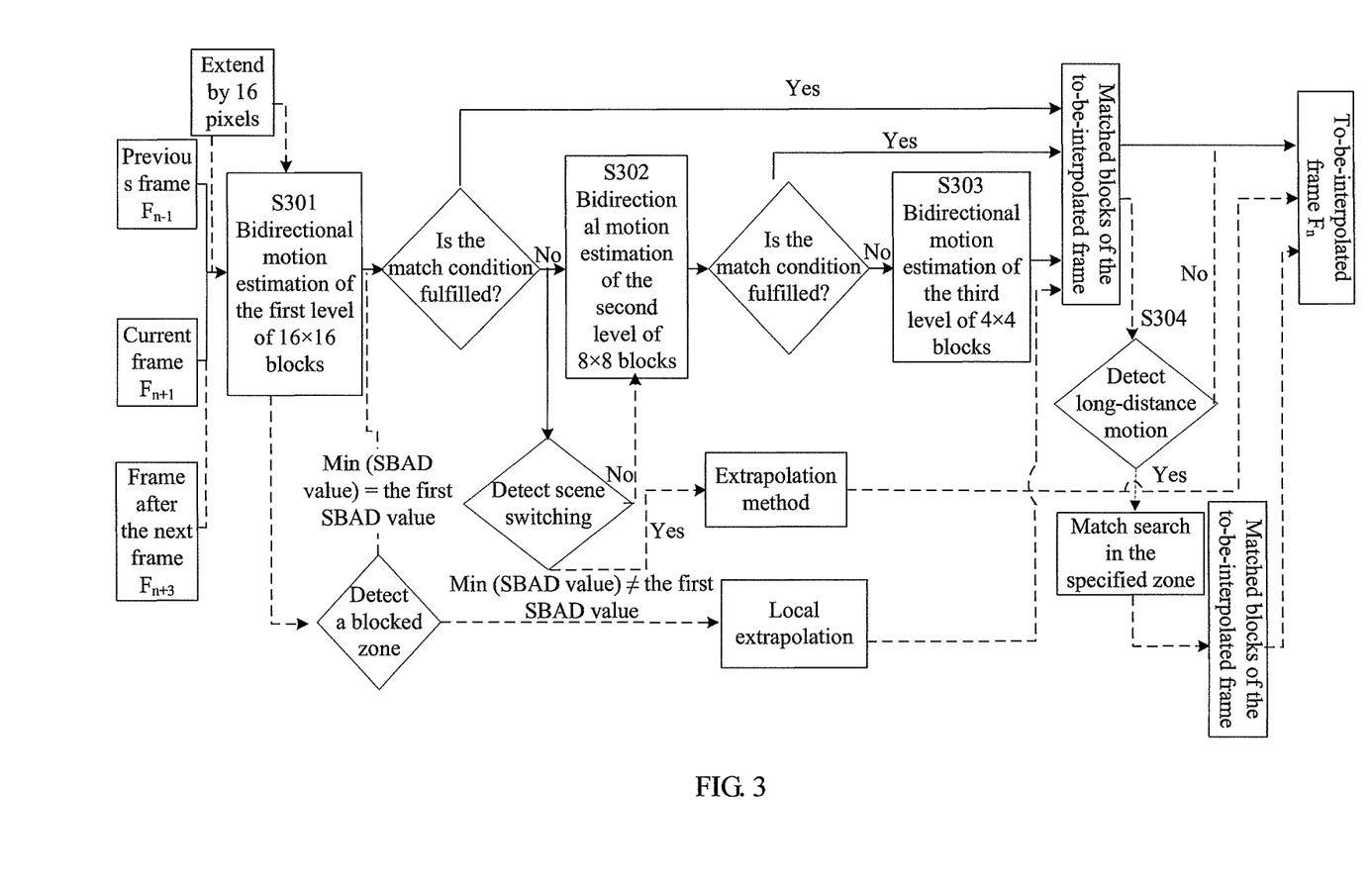
FIG. 3 is a flowchart of a process of a multi-level bidirectional motion estimation method according to an embodiment of the present invention.

The following describes the present invention in more detail with reference to an example in FIG. 3. The embodiment in FIG. 3 uses 3 (the value of K is 3) levels of bidirectional motion estimation as an example, which, however, shall not be construed as a limitation to the embodiment of the present invention.

Figure 4:
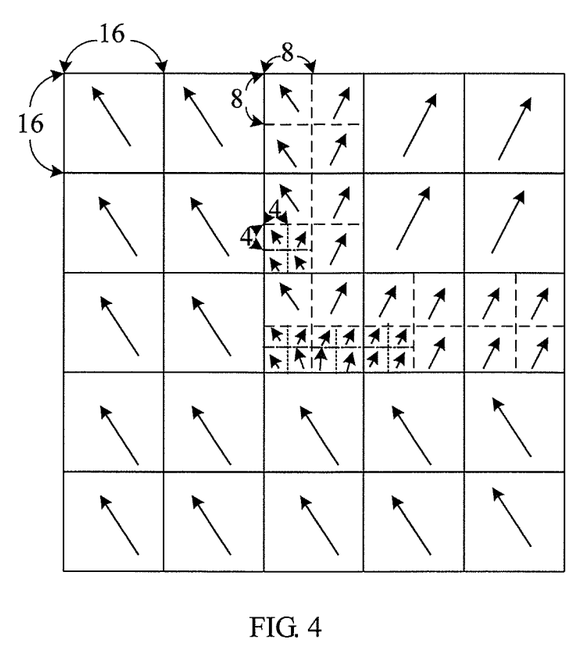
FIG. 4 is a schematic diagram of matched blocks of a 3-level to-be-interpolated frame according to an embodiment of the present invention.

Specifically, as shown in FIG. 4, each matched block in the first level of to-be-interpolated frame Fn is 16×16 blocks, and the corresponding SBAD threshold is V1; the matched block in the second level of to-be-interpolated frame Fn is 8×8 blocks, and the corresponding SBAD threshold is V1/4; and, the matched block in the third level of to-be-interpolated frame Fn is 4×4 blocks, and the corresponding SBAD threshold is V1/16.

S301. Bidirectional motion estimation of the first level of 16×16 blocks: Search for matched blocks in the current frame Fn+1 and the previous frame Fn−1 respectively by using each of the 16×16 blocks of the to-be-interpolated frame Fn as the mirror center, and determine the to-be-determined matched block pair that corresponds to each of the 16×16 blocks of the to-be-interpolated frame Fn respectively, where each to-be-determined matched block pair is a pair of matched blocks with the minimum SBAD value among all pairs of matched block pairs searched out in the current frame Fn+1 and the previous frame Fn−1.

It is determined whether a condition is fulfilled: The SBAD value of the to-be-determined matched block pair is compared with the SBAD threshold V1.

A motion vector (such as an average value of the motion vectors of the to-be-determined matched block pair) of the corresponding 16×16 blocks of the to-be-interpolated frame Fn is determined according to the motion vectors of the to-be-determined matched block pair if an SBAD value of a to-be-determined matched block pair is less than the SBAD threshold V1.

If the SBAD value of a to-be-determined matched block pair is greater than or equal to the SBAD threshold V1, step S302 is performed, and bidirectional motion estimation of the second level of 8×8 blocks is performed.

Optionally, before step S301 is performed, the boundaries of the current frame Fn+1 and the previous frame Fn−1 may be extended circumferentially by 16 pixels respectively, where the boundary pixel values of both the current frame Fn+1 and the previous frame Fn−1 are non zeros. In this way, when an object enters or exits a boundary of an image, the to-be-interpolated frame Fn obtained according to the technical solution of the present invention can reduce the "block effect" at the boundary, and improve image quality.

Optionally, in detection of a blocked zone, the frame after the next frame, which is denoted by Fn+3, may be used again to perform bidirectional motion estimation of the first level of 16×16 blocks between the current frame Fn+1 and the previous frame Fn−1 to generate a first SBAD value, and to perform bidirectional motion estimation of the first level of 16×16 blocks between the current frame Fn+1 and the frame after the next frame Fn+3 to generate a second SBAD value, and to perform bidirectional motion estimation of the first level of 16×16 blocks between the previous frame Fn−1 and the frame after the next frame Fn+3 to generate a third SBAD value.

When the first SBAD value is a minimum value among the first SBAD value, the second SBAD value, and the third SBAD value, it is determined whether a match condition is fulfilled, and the first SHAD value is compared with the SBAD threshold V1. When the first SBAD value is not the minimum value among the first SBAD value, the motion vectors of the corresponding 16×16 blocks may be obtained by using a local area extrapolation method. In a possible implementation manner, when the second SBAD value is the minimum value among the first SBAD value, the second SBAD value, and the third SBAD value, the M1×M1 blocks of the to-be-interpolated frame Fn are obtained by extrapolating corresponding matched blocks of the current frame Fn+1, that is, the corresponding matched blocks of the current frame Fn+1 are copied as the M1×M1 blocks of the to-be-interpolated frame Fn. In another possible implementation manner, when the third SBAD value is the minimum value among the first SBAD value, the second SBAD value, and the third SBAD value, the M1×M1 blocks of the to-be-interpolated frame Fn are obtained by extrapolating the matched blocks of the current frame Fn+1 that correspond to the M1×M1 blocks of the to-be-interpolated frame Fn, that is, the corresponding matched blocks of the previous frame Fn−1 are copied as the M1×M1 blocks of the to-be-interpolated frame Fn. Therefore, when the solution in the embodiment of the present invention is applied to blocking processing, it is not necessary to perform motion estimation twice, that is, forward motion estimation and backward motion estimation, thereby reducing the amount of computing. In addition, the to-be-interpolated frame Fn obtained through the blocking processing improves image quality effectively.

Optionally, a scene switching detection is performed after the bidirectional motion estimation of the first level of 16×16 blocks is performed. Specifically, when it is determined that the number of all the following to-be-determined matched block pairs is less than a preset threshold, that is, the to-be-determined matched block pairs that correspond to the 16×16 blocks of the to-be-interpolated frame Fn and have an SBAD value greater than or equal to the SBAD threshold, it is determined that no scene switching occurs, and step S302, that is, the bidirectional motion estimation of the second level of 8×8 blocks, is performed. When it is determined that the number of all the following to-be-determined matched block pairs is greater than a preset threshold, that is, the to-be-determined matched block pairs that correspond to the 16×16 blocks of the to-be-interpolated frame Fn and have an SBAD value greater than or equal to the SBAD threshold, it is determined that scene switching occurs, and the to-be-interpolated frame Fn is obtained in an extrapolation manner. Optionally, the current frame Fn+1 may be copied as the to-be-interpolated frame Fn, or the previous frame Fn−1 may be copied as the to-be-interpolated frame Fn. When scene switching occurs between adjacent frames, if the to-be-determined matched block pairs with an SBAD value greater than or equal to the SBAD threshold are not counted until multiple levels of motion estimation are performed, the amount of computing increases and the multiple levels of motion estimation are futile because the to-be-interpolated frame Fn is presumed to be obtained by using an extrapolation method. Therefore, the amount of computing is reduced effectively if the counting is performed after the bidirectional motion estimation of the first level of 16×16 blocks is performed.

S302. Bidirectional motion estimation of the second level of 8×8 blocks: Split the 16×16 blocks of the corresponding to-be-interpolated frame Fn into four 8×8 blocks, and search for the matched blocks again in the current frame Fn+1 and the previous frame Fn−1 respectively by using the 8×8 blocks of the to-be-interpolated frame Fn as a mirror center, where an SBAD threshold for searching for the matched blocks again is 8/(2*16)=¼ of the SBAD threshold V1 applied in the previous time of searching for the matched blocks, that is, V1/4.

Similarly, it is determined whether the condition is fulfilled: The motion vectors of the 8×8 blocks of the corresponding to-be-interpolated frame Fn are determined according to the motion vectors of the to-be-determined matched block pair if the SBAD value of a to-be-determined matched block pair corresponding to 8×8 blocks of the to-be-interpolated frame Fn is less than the SBAD threshold V1/4.

S303. Bidirectional motion estimation of the third level of 4×4 blocks: If the SBAD value of a to-be-determined matched block pair corresponding to 8×8 blocks of the to-be-interpolated frame is greater than or equal to the SBAD threshold V1/4, split the 8×8 blocks of the corresponding to-be-interpolated frame Fn into four 4×4 blocks, and search for the matched blocks again in the current frame Fn+1 and the previous frame Fn−1 respectively by using the 4×4 blocks of the to-be-interpolated frame Fn as a mirror center, where the SHAD threshold for searching for the matched blocks again is 4/(2*8)=¼ of the SBAD threshold V1/4 applied in the previous time of searching for the matched blocks, that is, V1/16. The motion vectors of the 4×4 blocks of the corresponding to-be-interpolated frame Fn are determined according to the motion vectors of the to-be-determined matched block pair if the SBAD value of a to-be-determined matched block pair corresponding to 4×4 blocks of the to-be-interpolated frame Fn is less than the SBAD threshold V1/16.

Optionally, the motion vectors of the 4×4 blocks of the to-be-interpolated frame may be determined according to the motion vectors of the matched block pairs around the to-be-determined matched block pair corresponding to 4×4 blocks of the to-be-interpolated frame Fn if the SBAD value of a to-be-determined matched block pair corresponding to 4×4 blocks of the to-be-interpolated frame Fn is greater than or equal to the SBAD threshold V1/16.

S304. Long-distance motion detection may be performed. All the blocks that do not participate in interpolation in the current frame Fn+1 and the previous frame Fn−1 (for example, the blocks that are not flagged for interpolation) may be combined into the specified zone. Based on that, it is determined whether any long-distance motion occurs. If any long-distance motion occurs, for example, the specified zone exists, the to-be-determined matched block pair may be searched for in the specified zone, and the motion vectors corresponding to 4×4 blocks of the to-be-interpolated frame Fn may be determined according to the motion vectors of the to-be-determined matched block pair searched out in the specified zone. Therefore, accuracy of motion estimation can be improved effectively when long-distance motion of the object occurs. Understandably, S304 is optional.

Optionally, in the embodiment of the multiple levels of bidirectional motion estimation, a 3-D RS search algorithm is applied to the 16×16 blocks and the 8×8 blocks of the to-be-interpolated frame Fn, and a hexagon search algorithm is applied to the 4×4 blocks of the to-be-interpolated frame Fn, which can smooth a motion vector field, reduce computing complexity, and converge quickly. Further, the matched blocks may be searched for twice in the current frame Fn+1 and the previous frame Fn−1 respectively by using the 16×16 blocks, 8×8 blocks, or 4×4 blocks of the to-be-interpolated frame Fn as a mirror center, where the two times of searching for the matched blocks have opposite orders of search (for example, the search is performed for the frames twice, that is, in a forward order of "from upper left to lower right" and in a reverse order of "from lower right to upper left").

Optionally, the to-be-determined matched block pair corresponding to the 16×16 blocks, 8×8 blocks, and 4×4 blocks of the to-be-interpolated frame Fn may be determined based on a block matching criterion in the above formula (I).

Understandably, the above examples are merely exemplary and not intended to limit the scope of the present invention.

The multi-level bidirectional motion estimation in the foregoing solution describes motion information more precisely, and improves image quality effectively.

Figure 5:
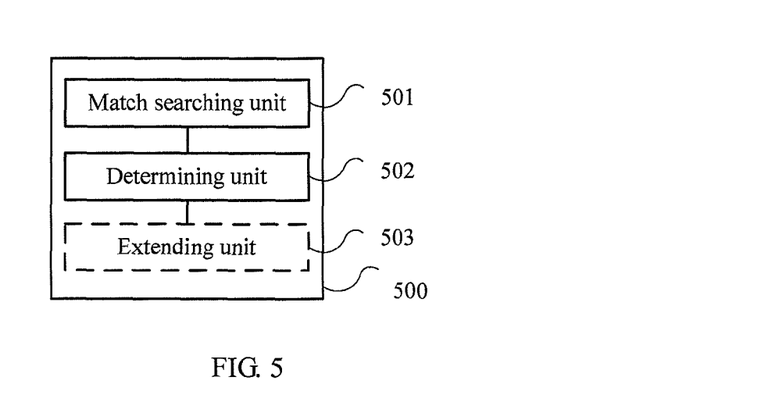
FIG. 5 is a structural block diagram of a multi-level bidirectional motion estimation device according to an embodiment of the present invention.

FIG. 5 is a structural block diagram of a multi-level bidirectional motion estimation device according to an embodiment of the present invention. The multi-level bidirectional motion estimation device 500 includes a match searching unit 501 and a determining unit 502.

The match searching unit 501 is configured to search for matched blocks in a current frame and a previous frame respectively by using M1×M1 blocks of a to-be-interpolated frame as a mirror center, where the previous frame is a frame before the to-be-interpolated frame, the current frame is a frame after the to-be-interpolated frame, and a algorithm for the search includes a three-dimensional recursive search algorithm or a hexagon search algorithm.

The determining unit 502 is configured to determine a first to-be-determined matched block pair corresponding to the M1×M1 blocks of the to-be-interpolated frame, where the first to-be-determined matched block pair is a pair of matched blocks with a minimum SBAD value among all pairs of matched blocks searched out by the searching unit 401 in the current frame and the previous frame.

The determining unit 502 is further configured to determine motion vectors of the M1×M1 blocks of the to-be-interpolated frame according to motion vectors of the first to-be-determined matched block pair if it is determined that an SBAD value of the first to-be-determined matched block pair is less than an SBAD threshold.

The match searching unit 501 is further configured to: if the SBAD value of the first to-be-determined matched block pair, which is determined by the determining unit 502, is greater than or equal to the SBAD threshold, split the M1×M1 blocks of the to-be-interpolated frame into M2×M2 blocks, and search for matched blocks again in the current frame and the previous frame respectively by using the M2×M2 blocks of the to-be-interpolated frame as a mirror center, where an SHAD threshold for searching for the matched blocks again is ¼ of the SBAD threshold applied in the previous time of searching for the matched blocks, both M1 and M2 are 2 to the power of m, m is a positive integer, and M2=M1/2.

In the embodiment of the present invention, based on bidirectional motion estimation, matched blocks are searched for in the frames (the current frame and the previous frame) before and after the to-be-interpolated frame respectively by using the M1×M1 blocks of the to-be-interpolated frame as the mirror center, and a pair of matched blocks with a minimum SBAD value among all the searched pairs of matched blocks is determined as the first to-be-determined matched block. If the SBAD value of the first to-be-determined matched block pair is greater than or equal to the SBAD threshold, the M1×M1 blocks are split into M2×M2 blocks with reference to a multi-level method, and the matched blocks are searched for again, where the SBAD threshold for searching for the matched blocks again is ¼ of the SBAD threshold applied in the previous time of searching for the matched blocks. Therefore, with the multi-level method combined with the bidirectional motion estimation, the M1×M1 blocks of the to-be-interpolated frame are decomposed gradually, and motion information is described more precisely. In addition, a three-dimensional recursive search algorithm or a hexagon search algorithm is applied in the motion estimation, and therefore, a smooth motion vector field can be obtained, convergence is fast, and complexity is low, which improves motion estimation accuracy effectively and improves image quality.

A multi-level bidirectional motion estimation device 500 can implement the embodiments in FIG. 1 to FIG. 7. Therefore, to avoid repetition, no more details are given here any further.

It should be noted that the embodiment of the present invention does not limit the number of blocks into which the to-be-interpolated frame is split, or the size of each matched block. A to-be-interpolated frame is split into one or more matched blocks, and each matched block is an Mi×Mi block, where Mi is a positive integer. The embodiment of the present invention does not limit how many levels of motion estimation in the multi-level method (that is, the value of K in the K levels of motion estimation, where K is a positive integer greater than or equal to 2) is applied. It is assumed that each matched block of the $i^{th}$ level motion estimation is an M1×M1 block, and each matched block of the $(i+1)^{th}$ level motion estimation is an M2×M2 block, where i is a positive integer.

Optionally, in another embodiment, the determining unit 502 may be further configured to determine a first SBAD value, a second SBAD value, and a third SBAD value, where the first SBAD value is an SBAD value generated by bidirectional motion estimation between the current frame and the previous frame, the second SBAD value is an SBAD value generated by bidirectional motion estimation between the current frame and a frame after a next frame, the third SBAD value is an SBAD value generated by bidirectional motion estimation between the previous frame and the frame after the next frame, and the frame after the next frame is a frame after the current frame. The match searching unit 401 is specifically configured to search for the matched blocks in the current frame and the previous frame respectively by using the M1×M1 blocks of the to-be-interpolated frame as the mirror center when the first SBAD value is a minimum value among the first SBAD value, the second SBAD value, and the third SBAD value that are determined by the determining unit 502.

Optionally, the determining unit 502 may be further configured to: when the second SBAD value is the minimum value among the first SBAD value, the second SBAD value, and the third SBAD value, obtain the M1×M1 blocks of the to-be-interpolated frame by extrapolating corresponding matched blocks of the current frame, that is, copy the corresponding matched blocks of the current frame as the M1×M1 blocks of the to-be-interpolated frame.

Optionally, the determining unit 502 may be further configured to: when the third SBAD value is the minimum value among the first SBAD value, the second SBAD value, and the third SBAD value, obtain the M1×M1 blocks of the to-be-interpolated frame by, extrapolating corresponding matched blocks of the previous frame, that is, copy the corresponding matched blocks of the previous frame as the M1×M1 blocks of the to-be-interpolated frame.

The foregoing solution is applicable to a scene in which a background is covered or exposed (that is, the problem of "blocking") due to motion of the object. When the solution in the embodiment of the present invention is applied to blocking processing, it is not necessary to perform motion estimation twice, that is, forward motion estimation and backward motion estimation, thereby reducing the amount of computing. In addition, the prior art does not point out how to process the blocks in the to-be-interpolated frame. In a blocking scene, the to-be-interpolated frame obtained through the blocking processing in the embodiment of the present invention improves image quality effectively compared with the to-be-interpolated frame obtained through no blocking processing.

Optionally, in another embodiment, the device 500 further includes an extending unit 503. The extending unit 503 is configured to, set boundary pixel values of both the current frame and the previous frame to non zeros, extend boundaries of the current frame and the previous frame circumferentially by M1 pixels respectively when an object enters or exits a scene at a boundary of the current frame against a boundary of the previous frame.

When an object enters or exits a boundary of an image, the motion estimation in the prior art leads to a "block effect" at the boundary of the to-be-interpolated frame; however, the to-be-interpolated frame obtained according to the technical solution of the present invention can reduce the "block effect" at the boundary, and improve image quality.

Optionally, in another embodiment, the determining unit 502 may be further configured to: when a scene is switched at the current frame against the previous frame, after the matched blocks are searched for the first time, obtain the to-be-interpolated frame in an extrapolation manner when it is determined that the number of all the following to-be-determined matched block pairs is greater than a preset threshold, that is, the to-be-determined matched block pairs that correspond to the M1×M1 blocks of the to-be-interpolated frame and have an SBAD value greater than or equal to the SBAD threshold. Optionally, the current frame may be copied as the to-be-interpolated frame, or the previous frame may be copied as the to-be-interpolated frame.

If the to-be-determined matched block pairs with an SBAD value greater than or equal to the SBAD threshold are not counted until multiple levels of motion estimation are performed, the amount of computing increases and the multiple levels of motion estimation are futile because the to-be-interpolated frame is presumed to be obtained by using an extrapolation method. Therefore, the amount of computing is reduced effectively if the counting is performed after the first time of searching for the matched blocks.

Optionally, in another embodiment, the match searching unit 501 may be further configured to: if the SBAD value of the first to-be-determined matched block pair, which is determined by the determining unit 502, is greater than or equal to the SBAD threshold after K levels of motion estimation are performed, search for a second to-be-determined matched block pair in a specified zone of the current frame and the previous frame, where the specified zone is all blocks that do not participate in the interpolation in the current frame and the previous frame. The determining unit 502 may be further configured to determine motion vectors of M×M blocks of the to-be-interpolated frame according to motion vectors of the second to-be-determined matched block pair, where the M×M blocks of the to-be-interpolated frame are matched blocks corresponding to the $K^{th}$ level of motion estimation, M is 2 to the power of m, and m is a positive integer.

According to the foregoing technical solution, accuracy of motion estimation can be improved effectively when long-distance motion of the object occurs.

Optionally, in an embodiment, the determining unit 502 may be further configured to: if it is determined that the SBAD value of the first to-be-determined matched block pair is greater than or equal to the SBAD threshold after the K levels of motion estimation are performed, determine the motion vectors of M×M blocks of the to-be-interpolated frame according to motion vectors of matched block pairs around the first to-be-determined matched block pair, where the M×M blocks of the to-be-interpolated frame are matched blocks corresponding to the $K^{th}$ level of motion estimation, M is 2 to the power of m, and m is a positive integer.

Optionally, in another embodiment, the match searching unit 501 is specifically configured to search for the matched blocks twice in the current frame and the previous frame respectively by using the M1×M1 blocks of the to-be-interpolated frame as a mirror center, where the two times of searching for the matched blocks have opposite orders of search.

Optionally, in another embodiment, the determining unit 502 is specifically configured to determine a first to-be-determined matched block pair corresponding to the M1×M1 blocks of the to-be-interpolated frame based on a block matching criterion in the foregoing formula (1).

Understandably, the application of the embodiment of the present invention is not limited. For example, the embodiment of the present invention is applicable to videophones and conference calls. The embodiment of the present invention can also improve image quality of a flatscreen television, for example, overcome defects such as motion blurs, image jitters, and image streaking existing in the display of a liquid crystal display (Liquid Crystal Display, LCD); or, overcome problems such as massive flicker in the display of a plasma display panel (Plasma Display Panel, PDP).

Figure 6:
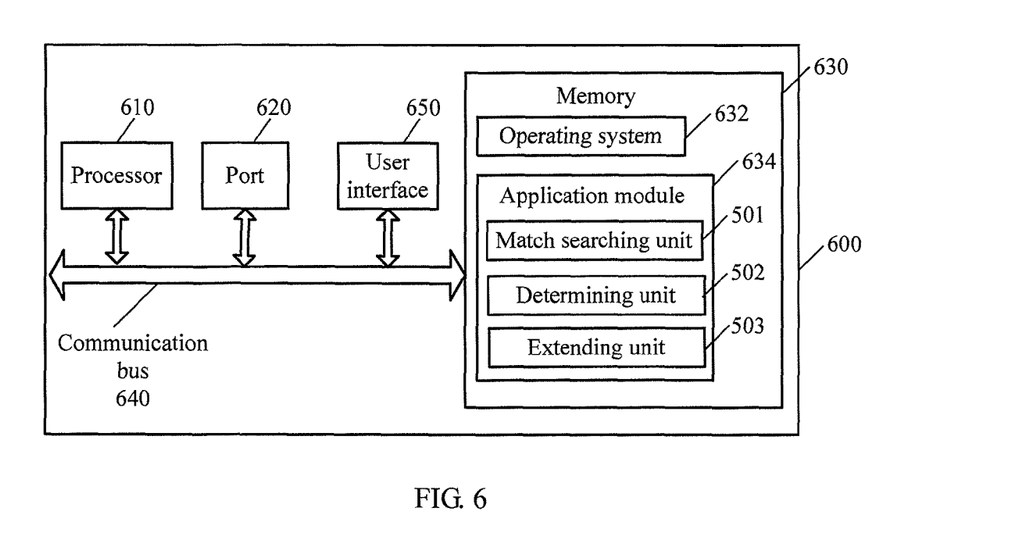
FIG. 6 is a structural block diagram of a multi-level bidirectional motion estimation device according to another embodiment of the present invention.

FIG. 6 is a structural block diagram of a multi-level bidirectional motion estimation device according to another embodiment of the present invention.

As shown in FIG. 6, the multi-level bidirectional motion estimation device 600 generally includes at least one processor 610 such as CPU, at least one port 620, a memory 630, and at least one communication bus 640. The communication bus 640 is configured to implement connection and communication between the apparatuses. The processor 610 is configured to execute executable modules, such as computer programs, stored in the memory 630. Optionally, the device 600 may include a user interface 650, and the user interface 650 includes, but is not limited to, a display, a keyboard, and a click device such as a mouse, a trackball (trackball), a touchpad, or a touchscreen. The memory 630 may include a high-speed RAM or a non-volatile memory (non-volatile memory), for example, at least one disk memory.

In some implementation manners, the memory 630 stores the following elements, executable modules or data structures, or their subsets, or their extension sets.

The operating system 632 includes various system programs and is configured to implement various basic services and process hardware-based tasks.

The application module 634 includes various applications and is configured to implement various application services.

The application module 634 includes, but is not limited to, a match searching unit 501, a determining unit 502, and an extending unit 503.

For specific implementation of each unit in the application module 634, refer to the corresponding unit in the embodiment shown in FIG. 8, and no repeated description is given here any further.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device or the like) to perform all or a part of the steps of the methods described in the embodiments of the present invention. The foregoing storage medium includes: any mediums capable of storing program code, such as a USE flash drive, a removable hard disk, a read-only memory (ROM, Read-Only Memory), a random access memory (RAM, Random Access Memory), a magnetic disk, or an optical disc.

What is claimed is:

1. A multi-level bidirectional motion estimation method, comprising:
    searching for matched blocks in a current frame and a previous frame respectively by using M1×M1 blocks of a to-be-interpolated frame as a mirror center, wherein the previous frame is a frame before the to-be-interpolated frame, the current frame is a frame after the to-be-interpolated frame, and a algorithm for the search comprises a three-dimensional recursive search algorithm or a hexagon search algorithm;
    determining a first to-be-determined matched block pair corresponding to the M1×M1 blocks of the to-be-interpolated frame, wherein the first to-be-determined matched block pair is a pair of matched blocks with a minimum sum of binary absolute difference (SBAD) value among all pairs of matched blocks searched out in the current frame and the previous frame;
    determining motion vectors of the M1×M1 blocks of the to-be-interpolated frame according to motion vectors of the first to-be-determined matched block pair if it is determined that an SBAD value of the first to-be-determined matched block pair is less than an SBAD threshold; and
    if it is determined that the SHAD value of the first to-be-determined matched block pair is greater than or equal to the SBAD threshold, splitting the M1×M1 blocks of the to-be-interpolated frame into M2×M2 blocks, and searching for matched blocks again in the current frame and the previous frame respectively by using the M2×M2 blocks of the to-be-interpolated frame as a mirror center, wherein an SHAD threshold for searching for the matched blocks again is ¼ of the SHAD threshold applied in the previous time of searching for the matched blocks, both M1 and M2 are 2 to the power of m, m is a positive integer, and M2=M1/2.

2. The method according to claim 1, wherein:
    before determining a first to-be-determined matched block pair corresponding to the M1×M1 blocks of the to-be-interpolated frame, the method further comprises:
        determining a first SBAD value, a second SBAD value, and a third SBAD value, wherein the first SBAD value is an SHAD value generated by bidirectional motion estimation between the current frame and the previous frame, the second SHAD value is an SBAD value generated by bidirectional motion estimation between the current frame and a frame after a next frame, the third SHAD value is an SHAD value generated by bidirectional motion estimation between the previous frame and the frame after the next frame, and the frame after the next frame is a frame after the current frame; and
    searching for matched blocks in a current frame and a previous frame respectively by using M1×M1 blocks of a to-be-interpolated frame as a mirror center comprises:
        searching for the matched blocks in the current frame and the previous frame respectively by using the M1×M1 blocks of the to-be-interpolated frame as the mirror center when the first SBAD value is a minimum value among the first SBAD value, the second SBAD value, and the third SHAD value.

3. The method according to claim 2, wherein the method further comprises:
    corresponding matched blocks of the current frame are extrapolated to obtain the M1×M1 blocks of the to-be-interpolated frame when the second SBAD value is a minimum value among the first SBAD value, the second SBAD value, and the third SBAD value; and
    corresponding matched blocks of the previous frame are extrapolated to obtain the M1×M1 blocks of the to-be-interpolated frame when the third SBAD value is a minimum value among the first SBAD value, the second SHAD value, and the third SBAD value.

4. The method according to claim 1, wherein: when an object enters or exits a scene at a boundary of the current frame against a boundary of the previous frame, before searching for the matched blocks in a current frame and a previous frame respectively by using M1×M1 blocks of the to-be-interpolated frame as a mirror center, the method further comprises:
    setting boundary pixel values of both the current frame and the previous frame to non zeros, and extending the boundaries of the current frame and the previous frame circumferentially by M1 pixels respectively.

5. The method according to claim 1, wherein: when a scene is switched at the current frame against the previous frame, after the matched blocks are searched out for the first time, the method further comprises:
    obtaining the to-be-interpolated frame in an extrapolation manner when it is determined that the number of all the following to-be-determined matched block pairs is greater than a preset threshold, that is, the to-be-determined matched block pairs that correspond to the M1×M1 blocks of the to-be-interpolated frame and have an SBAD value greater than or equal to the SHAD threshold.

6. The method according to claim 1, wherein the method further comprises:
    searching for a second to-be-determined matched block pair in a specified zone of the current frame and the previous frame after K levels of motion estimation of the multiple levels of bidirectional motion estimation are performed, wherein the specified zone is all blocks that do not participate in the interpolation in the current frame and the previous frame, and K is a positive integer greater than or equal to 2; and
    determining motion vectors of M×M blocks of the to-be-interpolated frame according to motion vectors of the second to-be-determined matched block pair, wherein the M×M blocks of the to-be-interpolated frame are matched blocks corresponding to the $K^{th}$ level of motion estimation, M is 2 to the power of m, and m is a positive integer.

7. The method according to claim 1, wherein:
    if it is determined that the SBAD value of the first to-be-determined matched block pair is greater than or equal to the SBAD threshold after the K levels of motion estimation in the multiple levels of bidirectional motion estimation are performed, determining the motion vectors of M×M blocks of the to-be-interpolated frame according to motion vectors of matched block pairs around the first to-be-determined matched block pair, wherein the M×M blocks of the to-be-interpolated frame are matched blocks corresponding to the $K^{th}$ level of motion estimation, M is 2 to the power of m, m is a positive integer, and K is a positive integer greater than or equal to 2.

8. The method according to claim 1, wherein searching for matched blocks in a current frame and a previous frame respectively by using M1×M1 blocks of a to-be-interpolated frame as a mirror center comprises:
searching for the matched blocks twice in the current frame and the previous frame respectively by using the M1×M1 blocks of the to-be-interpolated frame as a mirror center, wherein the two times of searching for the matched blocks have opposite orders of search.

9. The method according to claim 1, wherein determining a first to-be-determined matched block pair corresponding to the M1×M1 blocks of the to-be-interpolated frame comprises:
determining the first to-be-determined matched block pair corresponding to the M1×M1 blocks of the to-be-interpolated frame based on a block matching criterion, wherein the block matching criterion is:

$$SBAD(v, B_{i,j}) = \sum_{s \in B_{i,j}} |f_{n-1}(s+v) - f_{n+1}(s-v)|$$

wherein, the SBAD is the SBAD value of the matched block pair, $B_{i,j}$ is the M1×M1 blocks of the to-be-interpolated frame, s is a pixel point of the to-be-interpolated frame, v is a shift vector, $f_{n-1}$ is a pixel value of the current frame, and $f_{n+1}$ is a pixel value of the previous frame.

10. A multi-level bidirectional motion estimation device, comprising:
a match searching unit, configured to search for matched blocks in a current frame and a previous frame respectively by using M1×M1 blocks of a to-be-interpolated frame as a mirror center, wherein the previous frame is a frame before the to-be-interpolated frame, the current frame is a frame after the to-be-interpolated frame, and a algorithm for the search comprises a three-dimensional recursive search algorithm or a hexagon search algorithm; and
a determining unit, configured to determine a first to-be-determined matched block pair corresponding to the M1×M1 blocks of the to-be-interpolated frame, wherein the first to-be-determined matched block pair is a pair of matched blocks with a minimum sum of binary absolute difference (SBAD) value among all pairs of matched blocks searched out by the searching unit in the current frame and the previous frame, wherein
the determining unit is further configured to determine motion vectors of the M1×M1 blocks of the to-be-interpolated frame according to motion vectors of the first to-be-determined matched block pair if it is determined that an SHAD value of the first to-be-determined matched block pair is less than an SBAD threshold; and
the match searching unit is further configured to: if the SBAD value of the first to-be-determined matched block pair, which is determined by the determining unit, is greater than or equal to the SBAD threshold, split the M1×M1 blocks of the to-be-interpolated frame into M2×M2 blocks, and search for matched blocks again in the current frame and the previous frame respectively by using the M2×M2 blocks of the to-be-interpolated frame as a mirror center, wherein an SBAD threshold for searching for the matched blocks again is ¼ of the SHAD threshold applied in the previous time of searching for the matched blocks, both M1 and M2 are 2 to the power of m, m is a positive integer, and M2=M1/2.

11. The device according to claim 10, wherein:
the determining unit is further configured to determine a first SBAD value, a second SBAD value, and a third SBAD value, wherein the first SBAD value is an SBAD value generated by bidirectional motion estimation between the current frame and the previous frame, the second SHAD value is an SBAD value generated by bidirectional motion estimation between the current frame and a frame after a next frame, the third SBAD value is an SBAD value generated by bidirectional motion estimation between the previous frame and the frame after the next frame, and the frame after the next frame is a frame after the current frame; and
the match searching unit is configured to search for the matched blocks in the current frame and the previous frame respectively by using the M1×M1 blocks of the to-be-interpolated frame as the mirror center when the first SBAD value is a minimum value among the first SBAD value, the second SBAD value, and the third SBAD value.

12. The device according to claim 11, wherein:
the determining unit is further configured to obtain the M1×M1 blocks of the to-be-interpolated frame by extrapolating corresponding matched blocks of the current frame when the second SBAD value is a minimum value among the first SBAD value, the second SBAD value, and the third SBAD value; and
the determining unit is further configured to obtain the M1×M1 blocks of the to-be-interpolated frame by extrapolating corresponding matched blocks of the previous frame when the third SBAD value is a minimum value among the first SBAD value, the second SBAD value, and the third SBAD value.

13. The device according to claim 10, wherein the device further comprises an extending unit, and
the extending unit is configured to: when an object enters or exits a scene at a boundary of the current frame against a boundary of the previous frame, set boundary pixel values of both the current frame and the previous frame to non zeros, extend the boundaries of the current frame and the previous frame circumferentially by M1 pixels respectively.

14. The device according to claim 10, wherein:
the determining unit is further configured to: when a scene is switched at the current frame against the previous frame, after the matched blocks are searched out for the first time, obtain the to-be-interpolated frame in an extrapolation manner when it is determined that the number of all the following to-be-determined matched block pairs is greater than a preset threshold, that is, the to-be-determined matched block pairs that correspond to the M1×M1 blocks of the to-be-interpolated frame and have an SHAD value greater than or equal to the SHAD threshold.

15. The device according to claim 10, wherein:
the match searching unit is further configured to: if the SHAD value of the first to-be-determined matched block pair, which is determined by the determining unit, is greater than or equal to the SHAD threshold after K levels of motion estimation of the multiple levels of bidirectional motion estimation are performed, search for a second to-be-determined matched block pair in a specified zone of the current frame and the previous frame, wherein the specified zone is all blocks that do not participate in the interpolation in the current frame and the previous frame; and the determining unit is further configured to determine motion vectors of M×M blocks of the to-be-interpolated frame according to motion vectors of the second to-be-determined matched block pair searched out by the match searching unit, wherein the M×M blocks of the to-be-interpolated frame are matched blocks corresponding to the $K^{th}$ level of motion estimation, M is 2 to the power of m, m is a positive integer, and K is a positive integer greater than or equal to 2.

16. The device according to claim 10, wherein:

the determining unit is further configured to: if it is determined that the SHAD value of the first to-be-determined matched block pair is greater than or equal to the SHAD threshold after the K levels of motion estimation in the multiple levels of bidirectional motion estimation are performed, determine the motion vectors of M×M blocks of the to-be-interpolated frame according to motion vectors of matched block pairs around the first to-be-determined matched block pair, wherein the M×M blocks of the to-be-interpolated frame are matched blocks corresponding to the $K^{th}$ level of motion estimation, M is 2 to the power of m, m is a positive integer, and K is a positive integer greater than or equal to 2.

17. The device according to claim 10, wherein:

the match searching unit is configured to search for the matched blocks twice in the current frame and the previous frame respectively by using the M1×M1 blocks of the to-be-interpolated frame as a mirror center, wherein the two times of searching for the matched blocks have opposite orders of search.

18. The device according to claim 10, wherein:

the determining unit is configured to determine the first to-be-determined matched block pair corresponding to the M1×M1 blocks of the to-be-interpolated frame based on a block matching criterion, wherein the block matching criterion is:

$$SBAD(v, B_{i,j}) = \sum_{s \in B_{i,j}} |f_{n-1}(s+v) - f_{n+1}(s-v)|$$

wherein, the SBAD is the SBAD value of the matched block pair, $B_{i,j}$ is the M1×M1 blocks of the to-be-interpolated frame, s is a pixel point of the to-be-interpolated frame, v is a shift vector, $f_{n-1}$ is a pixel value of the current frame, and $f_{n+1}$ is a pixel value of the previous frame.

* * * * *